(12) United States Patent
Taylor

(10) Patent No.: US 6,414,044 B2
(45) Date of Patent: Jul. 2, 2002

(54) FOAMED CAULK AND SEALANT COMPOUNDS

(75) Inventor: Anthony J. Taylor, Medina, OH (US)

(73) Assignee: DAP Products Inc., Baltimore, MD (US)

( * ) Notice: Subject to any disclaimer, the term of this patent is extended or adjusted under 35 U.S.C. 154(b) by 0 days.

(21) Appl. No.: 09/932,162

(22) Filed: Aug. 17, 2001

Related U.S. Application Data

(62) Division of application No. 09/243,564, filed on Feb. 3, 1999, now Pat. No. 6,291,536
(60) Provisional application No. 60/074,350, filed on Feb. 7, 1998.

(51) Int. Cl.$^7$ .................................................. G08J 9/30
(52) U.S. Cl. ........................... 521/65; 521/64; 521/72; 521/78; 521/79; 521/88; 521/98
(58) Field of Search .............................. 521/78, 79, 88, 521/98, 65, 72, 64

(56) References Cited

U.S. PATENT DOCUMENTS

| | | | |
|---|---|---|---|
| 406,585 A | 7/1889 | King | |
| 2,016,986 A | 10/1935 | Case | 106/24 |
| 3,317,140 A | 5/1967 | Smith | 239/107 |
| 3,346,195 A | 10/1967 | Groth | 239/337 |
| 3,687,890 A | 8/1972 | Susuki et al. | 260/41 R |
| 3,705,669 A | 12/1972 | Cox et al. | 222/394 |
| 3,843,586 A | 10/1974 | Wolf | 260/29.7 R |
| 3,912,665 A | 10/1975 | Spitzer et al. | 260/2.5 E |
| 3,912,666 A | 10/1975 | Spitzer et al. | 260/2.5 E |
| 3,912,667 A | 10/1975 | Spitzer et al. | 260/2.5 E |
| 4,036,673 A | 7/1977 | Murphy et al. | 156/71 |
| 4,123,005 A | 10/1978 | Blunk | 239/327 |
| 4,277,568 A | 7/1981 | Davison et al. | 521/68 |
| 4,328,319 A | 5/1982 | Osipow et al. | 521/78 |
| 4,350,774 A | 9/1982 | Scotti et al. | 521/95 |
| 4,364,521 A | 12/1982 | Stankowitz | 239/346 |
| 4,381,066 A | 4/1983 | Page et al. | 222/394 |
| 4,384,661 A | 5/1983 | Page et al. | 222/394 |
| 4,422,877 A | 12/1983 | Spitzer et al. | 106/122 |
| 4,501,825 A | 2/1985 | Magyar et al. | 521/78 |
| 4,504,602 A | 3/1985 | O'Connell et al. | 521/78 |
| 4,559,369 A | 12/1985 | Bauman et al. | 521/98 |
| 4,584,324 A | 4/1986 | Bauman et al. | 521/88 |
| 4,585,324 A | 4/1986 | Koyama et al. | 355/3 R |
| 4,692,473 A | 9/1987 | Wright et al. | 521/72 |
| 4,855,349 A | 8/1989 | Ingle | 524/432 |
| 4,863,518 A | 9/1989 | Blount | 106/74 |
| 4,931,479 A | 6/1990 | Morgan | 521/76 |
| 4,940,844 A | 7/1990 | Blunt | 521/116 |
| 4,960,802 A | 10/1990 | DIStefano | 521/72 |
| 4,996,240 A | 2/1991 | Osipow et al. | 521/78 |
| 4,999,383 A | 3/1991 | Blount | 521/103 |
| 5,037,011 A | 8/1991 | Woods | 222/394 |
| 5,055,511 A | 10/1991 | Ingle | 524/406 |
| 5,073,445 A | 12/1991 | Ingle | 428/314.4 |
| 5,084,503 A | 1/1992 | Iacoviello | 524/459 |
| 5,089,160 A | 2/1992 | Pallone et al. | 252/90 |
| 5,120,607 A | 6/1992 | Ingle | 428/423.1 |
| 5,135,813 A | 8/1992 | Ingle | 428/423.1 |
| 5,180,753 A | 1/1993 | Osipow et al. | 521/65 |
| 5,188,263 A | 2/1993 | Woods | 222/394 |
| 5,252,622 A | 10/1993 | DIStefano | 521/65 |
| 5,254,599 A | 10/1993 | Frank | 521/65 |
| 5,331,016 A | 7/1994 | Frank et al. | 521/64 |
| 5,334,655 A | 8/1994 | Carlson et al. | 524/804 |
| 5,338,776 A | 8/1994 | Peelor et al. | 523/166 |
| 5,341,970 A | 8/1994 | Woods | 222/394 |
| 5,360,826 A | 11/1994 | Egolf et al. | 521/54 |
| 5,476,879 A | 12/1995 | Woods et al. | 521/78 |
| 5,480,589 A | 1/1996 | Belser et al. | 261/76 |
| 5,505,344 A | 4/1996 | Woods | 222/394 |

FOREIGN PATENT DOCUMENTS

| | | | |
|---|---|---|---|
| CA | 1151350 | 2/1983 | 403/55 |
| DE | 2947999 | 6/1980 | |
| DE | 2915467 | 10/1980 | |
| GB | 1536312 | 12/1978 | |

OTHER PUBLICATIONS

Surfactants and Interfacial Phenomena 2nd Edition, Milton J Rosen, pp. 293–299.

Handbook of Aerosol Technology Second Edition, Van Nostrand Reinhold Company, 1979, pp. 358–359.

*Primary Examiner*—Morton Foelak
(74) *Attorney, Agent, or Firm*—Biebel & French

(57) ABSTRACT

Stable foam caulk, sealant and insulation compositions are disclosed. These compositions comprise aqueous emulsions of film forming polymers in combination with microfibers. The preferred film forming polymers and the microfibers include functional groups capable of forming bonds, particularly hydrogen bonds, between these components. In another aspect of the invention, the compositions include a high temperature foam stabilizer, such as a high molecular weight fatty alcohols, having melting points greater than about 110° F.

2 Claims, 5 Drawing Sheets

FOAMED CAULK AND SEALANT COMPOUNDS

RELATED APPLICATION

This application is a divisional of continued prosecution application Ser. No. 09/243,564 filed Feb. 3, 1999, now U.S. Pat. No. 6,291,536 which was based on provisional application Ser. No. 60/074,350 filed Feb. 7, 1998.

FIELD OF THE INVENTION

The present invention pertains to foamable compositions that, on foamed release thereof from an aerosol canister or the like, present a stable foamed product capable of use as a caulk, sealant, or insulating compound.

BACKGROUND OF THE INVENTION

Caulking, insulation and sealant compositions are used to seal joints and other voids and to reinforce framing, tiles, panels, lathing, wall board and other structural assemblies. Foamed application of such compositions from pressurized containers and the like is highly desirable due primarily to overall ease of application. Easy clean up concerns require that such foamed products should be washed off with simple soap and water solutions.

Some of the available foamed compositions are not stable and shrink after foamed application to the desired structure. Quite obviously, these products therefore fail in providing overall sealing or insulating efficacy. Moreover, other foamed products tend to sag or drip after application, again leading to failure.

Also, foams are often applied during the summer months at high temperatures. Some foams have experienced high temperature related sagging or running problems either at application or shortly thereafter.

It is accordingly desirable to improve the cohesiveness and high temperature stability of foams.

SUMMARY OF THE INVENTION

These and other objects are met by the foamable compositions of the instant invention. Compositions in accordance with the invention may be used, for example, to provide latex foam caulk and patching compounds, latex foam stucco including inside and outside wall treatment, ceiling and roof coatings, and latex foam adhesives. The compositions may be disposed in pressurized aerosol containers for foamed caulk bead application or they may be contained within large pressurized bulkpacks having flexible hose or gun connectors associated therewith so that building contractors and the like may be readily supplied with larger quantities of the compositions.

A composition in accordance with the invention comprises an aqueous latex emulsion of a film forming polymer. The latex emulsion is water dispersible and accordingly may be washed off a user's hands by soap and water.

The composition further comprises microfibers. Preferably, both the film forming polymer and the microfibers have functional groups capable of forming bonds, particularly hydrogen bonds, between themselves to improve the cohesion of the resulting foam. Desirable cohesion properties have been obtained using film forming polymers having hydroxyl or carbonyl functionality with fibers having amine functionality. Most preferably, the microfibers are composed of linear polymers such as nylon to minimize steric hindrance.

The composition further comprises a lipophilic surfactant. Preferably, it comprises a solid, lipophilic non-ionic surfactant having an HLB value of about 3 to about 8, more preferably about 3.5 to about 6. These surfactants are water insoluble and are chosen from the group of fatty acid (i.e., $C_{12}$ and greater) esters, fatty alcohol ethers and fatty acid amides. Most preferably, the surfactant comprises one or more ethoxylated fatty alcohols.

A host of liquidable gaseous propellant components may be employed. It is preferred to use a combination of dimethyl ether (DME) and a volatile liquid hydrocarbon wherein the liquid hydrocarbon is present, by volume, in an amount greater than the DME.

Without wishing to be bound to any particular theory of operation, it is thought that the solid lipophilic surfactant coats the volatile liquid hydrocarbon propellant constituent as the foamable composition is expelled from the pressurized container. The surfactant, on foam dispensing, changes from the liquid phase into the solid phase where it is positioned along the water/organic interface. At that location, the surfactant functions as a foam builder, supporting the bubbles formed by the volatile hydrocarbon and the surrounding polymer emulsion. On evaporation of the propellant and water from the emulsion, the polymer bubbles are stabilized by the waxy surfactant and polymer solids.

The high temperature stability of the composition may be improved by adding a stabilizer having a melting point greater than about 110° F. Preferred foam stabilizers include polar, linear saturated long chain fatty alcohols having greater than about 20 C atoms in the molecule. Behenyl alcohol is most preferred.

Conventional fillers may also be added to the composition to provide anti-sagging properties or desired pigmentation.

Foams produced by the foamable compositions of the invention exhibit better cohesion (e.g., greater tensile strength) than prior art foams formed from prior compositions. This improved cohesion manifests itself in reduced brittleness and improved puncture resistance. Furthermore, the added strength decreases the likelihood of "blow out"—that is, a rupture of the surface skin and continued expansion of the foam through the rupture. This phenomenon compromises the water resistance of the foam (i.e. the surface deposition of the quaternary amine, Mackernium SDC-85).

The invention will be further described in conjunction with the appended drawings and detailed description.

DETAILED DESCRIPTION OF THE PREFERRED EMBODIMENT(S)

Figure 1:
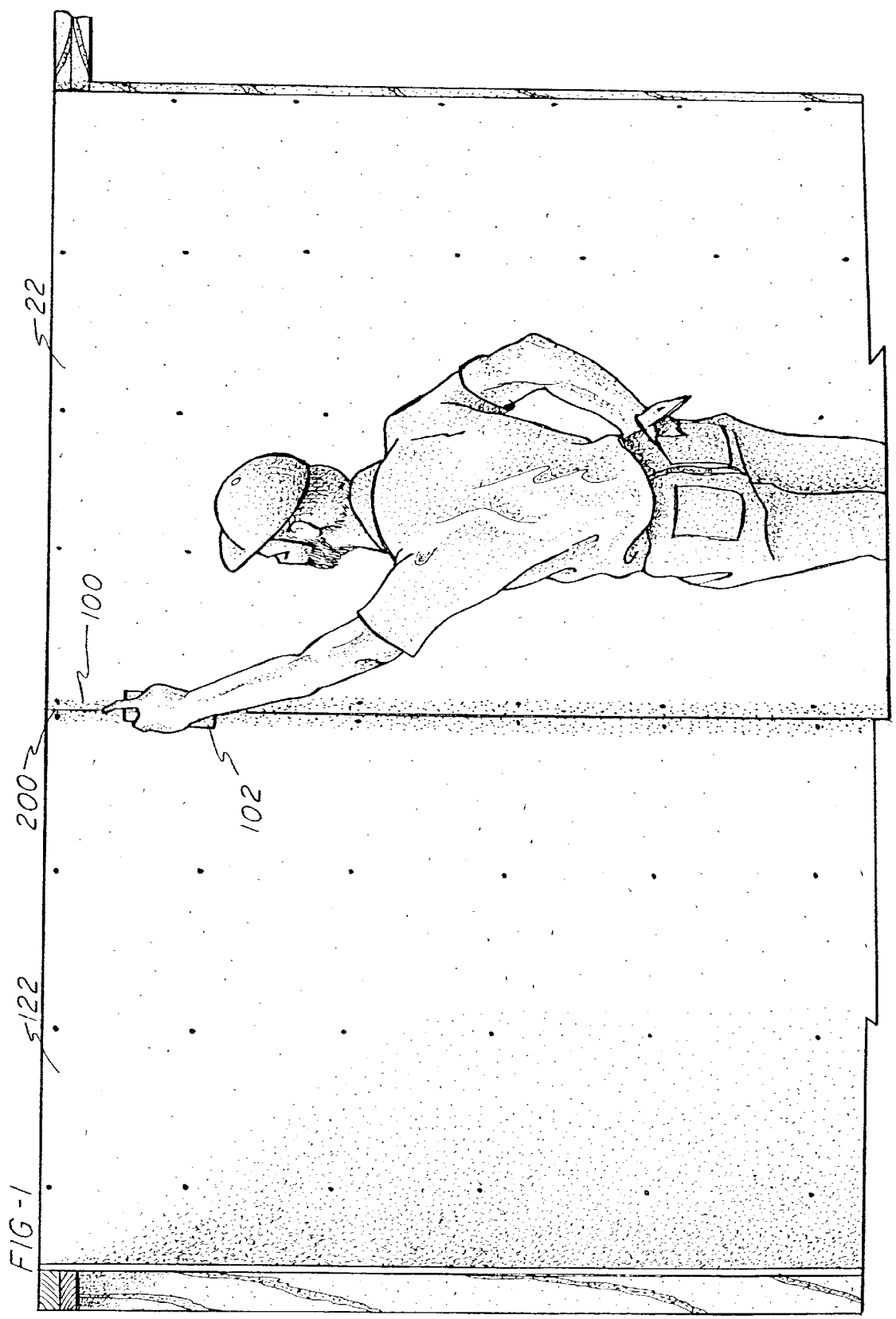
FIG. 1 is a schematic view showing use of the foamable compositions of the invention as a caulk to fill the gaps existing between adjacent wall board panels of a building.

The compositions of the invention are contained, before foaming, in an aerosol or larger bulk quantity container that, after loading with the composition, is charged to sufficient pressure to expel a foamed bead or rope-like strand of material from the housing. Such containers are well known in the art and need not be explained herein. Suffice it here to state that such containers are operatively associated with sufficient valve means so as to selectively open the container thereby allowing expulsion of the pressurized components housed therein and to close the container after the desired foamed application. One aerosol container that may be adapted for use in providing a foamed caulk-like product in accordance with the invention is shown in U.S. Pat. No. 3,705,669 (Cox).

The compositions of the invention comprise film forming polymer present in emulsion form. The film forming polymer may be defined as being dispersible by water when in emulsion form and the polymer itself is either dispersible in, or soluble in, the liquid propellant as shall be further specified herein. By film forming is meant that the polymer, after evaporation of the propellant, should remain in the form of a cohesive foam.

Generally, thermoplastic polymers as a class are acceptable as film forming polymers. Polymers derived from ethylenically unsaturated compounds such as styrene and/or acrylic acid and its lower alkyl esters may be mentioned as exemplary along with other vinyl compounds such as styrene and/or acrylic acid and its lower alkyl esters may be mentioned as exemplary along with other vinyl compounds such as vinyl acetate, vinyl butyrate etc. An exemplary listing of suitable film forming polymers can be seen in U.S. Pat. 4,381,066—incorporated by reference herein.

Preferred are latex emulsions comprising acrylic acid, lower alkyl acrylates, styrene, vinyl acetate and/or ethylene based polymers. One preferred combination is a combination of a styrene in a styrene acrylic support resin with a vinylacetate/ethylene copolymer. The glass transition temperatures of the polymeric constituents can vary over a wide range of about −40 to about 110° C. depending on the degree of hardness ultimately desired for the foam.

The propellant constituents can be chosen from a wide variety of known propellants such as the $C_1$–$C_6$ alkanes and $C_1$–$C_6$ alkenes. In this regard, volatile liquid hydrocarbons such as propane, n-butane, isobutane, hexane, n-pentane, 2-methylbutane, 1-pentene, butene, 2-methyl-2-butene, cyclobutane, cyclopentane and cyclohexane can be employed. Less desirably, halogenated hydrocarbons such as vinyl chloride; methyl chloride; methyl bromide; dichlorodifluoromethane; 1,1,1,2-tetrafluoroethane; 1,1-difluoroethane; and the like may be employed although some of these are not favored due to environmental concerns. A detailed listing of liquid propellants may be seen in U.S. Pat. No. 4,381,066 (Page et al.), the disclosure of which is incorporated herein by reference.

In addition to the volatile liquid hydrocarbon constituent described above, the propellant preferably comprises dimethyl ether (DME). The amount of the DME in the propellant component is controlled so that the volatile liquid hydrocarbon is present in a volumetrically greater amount that the DME. For example, the volatile liquid hydrocarbon should be present in an amount (by volume) of 1–5:1, preferable 2:1, volatile liquid hydrocarbon:DME.

The propellant is added to the foamable composition in an amount of about 2–10 wt % based on the total composition weight. Preferably, the propellant is present in an amount of between about 4–6 wt %.

The preferred surfactants include non-ionic solid, waxy lipophilic compounds having HLB values of about 3 to about 8, preferable about 3.5 to about 6. These surfactants are water insoluble and are chosen from the group of fatty (i.e. $C_{12}$ or greater) acid esters, fatty alcohol ethers and fatty acid amides. As to the fatty alcohol ethers, these include alkoxylated (preferably Et—O—) fatty alcohols.

Alternatively, it is believed that the lipophilic surfactant may comprise a liquid lipophilic surfactant in combination with a solid, waxy foam stabilizer. Preferably, the liquid lipophilic surfactant would be a liquid non-ionic surfactant having an HLB value of about 3 to about 14, most preferably about 4 to about 10. Of this class, non-ionic liquid fatty alcohol ethers such as ethoxylated (2) oleyl ether and PEG castor oils may be mentioned.

Exemplary solid, waxy foam stabilizers for use with these liquid lipophilic surfactants are believed to include fatty alcohols, fatty acids and diol esters of fatty acids such as the alkylene mono and di esters. Of these classes, myristyl, cetyl and stearyl alcohol; cetic and stearic acids; ethylene glycol mono and distearates; and propylene glycol monostearate may be mentioned. It is believed that the liquid surfactant and the waxy, solid foam stabilizer should be present in an amount of about 1:5 to about 5:1 parts by weight with a 1:2 ratio being preferred.

Preferably, a high temperature foam stabilizer having a melting point of about 110° F. and greater is added to improve the stability of the foam at temperatures above the melting points of the constituents of the surfactant. Most preferably, the foam stabilizer comprises a polar, linear saturated long chain fatty alcohol having greater than about 20 C atoms in the molecule high molecular weight fatty alcohol such as behenyl alcohol. Behenyl alcohol, which has a melting point of 159.8° C., is available commercially from Protomeen Chemicals, Inc. of Totowa, N.J. and, in a less purified form, under the trademark 1822A from Henkel Corporation of Cincinnati, Ohio. Their commercially available products are mixtures of long chain fatty alcohols as described above wherein the majority of the molecules in the mixture have greater than 20 C atoms.

The optional microfiber component of the invention comprises a water insoluble polymeric material compatible with the latex emulsion and surfactant to form a uniform solid-in-liquid suspension of the fibers in the emulsion. Preferred microfibers include those composed of linear polymers such as nylon, most preferably nylon 6 or nylon 6,6, having amine or other functionability capable of forming hydrogen bonds with hydroxyl and/or carbonyl functional groups in the film forming polymer. Most preferably, the lengths of the fibers do not exceed a limit of approximately one-eighth inch (3.2 mm), above which the fibers tend to clog the valve of the pressurized container.

In addition to the above components, the foamable compositions may also comprise a dispersant/solvent such as isopropanol (IPA) to aid in dispersing the surfactant. IPA also aids in foam drying and acts as a heat sink when the solid surfactant is melted and mixed during preparation of the foamable compositions.

Other components including fillers such as silica, asbestos, chalk, titanium dioxide, zinc oxide, siloxanes, other pigments, calcium carbonate and the like optionally may be added. Ethylene glycol and other freeze-thaw agents can be included in the formulation. Flame retardant compounds also may be added. These include antimony oxides; brominated and chlorinated paraffins; alumina; and aromatic flame retardants. All of these compounds are referred to herein broadly as "fillers".

In addition, water repellant compounds can be included in the compositions as needed. In this regard, a host of such compounds are commercially available and may be used. Exemplary water repellant compounds include the siloxanes, waxes and cationic water repellants. Preliminary data suggests that the cationic water repellants provide enhanced water repelling function without causing excessive "sag" in the foamed composition. At present, the cationic amines such as the quaternary ammonium salts are preferred. One such product is available under the trademark Mackernium SDC-85 from McIntyre Group Ltd., University Park, Ill. This product is a stearalkonium chloride available in flake form.

If ferrous metal containers are used to house the foamable composition, it may be desirable to add a minor amount of a rust inhibitor component to the composition. Rust inhibitors are available from many commercial suppliers. An exemplary rust inhibitor is available from Raybo Chemical Co. under the trademark Raybo 60 No Rust.

Anti-microbial agents such as fungicides, algaecides, mildewicides and the like may also be added to the composition. One such fungicide is sold under the trademark Polyphase AF1 and is available from Troy Chemical.

Exemplary compositions may include the following components:

| | | |
|---|---|---|
| a) Film forming o/w polymer emulsion | 50–98 | (wt % based on weight of foamable composition prior to charge of propellant) |
| b) microfibers | 0.00–10 | (wt % based on weight of foamable composition prior to charge of propellant) |
| c) surfactants | 1–10 | (wt % based on weight of foamable composition prior to charge of propellant) |
| d) foam high temperature stabilizer | 0.25–10 | (wt % based on weight of foamable composition prior to charge of propellant) |
| e) dispersant/solvent | 1–10 | (wt % based on weight of foamable composition prior to charge of propellant) |
| f) filler | 0–40 | (wt % based on weight of foamable composition prior to charge of propellant) |
| g) water repellant | 0–5 | (wt % based on weight of foamable composition prior to charge of propellant) |
| h) rust inhibitor | 0–5 | (wt % based on weight of foamable composition prior to charge of propellant) |
| i) anti-microbial agent | 0–5 | (wt % based on weight of foamable composition prior to charge of propellant) |
| a)–i) add up to 100 wt % propellant | 2–10 | (wt % based on weight of the composition including propellant) |

Typically, the surfactants and water repellants are melted and mixed with the dispersant/solvent. The high temperature foam stabilizer is melted and dispersed in the mixture of the surfactants, water repellants and dispersant/solvent. Then this mixture is combined with the requisite polymer emulsion(s). Subsequently, the microfibers and any desired fillers are blended thoroughly into the composition. The resulting composition is loaded into the desired container and charged with the propellant in an amount of about 2–10 wt % based on the total weight including the propellant. Optimal pressure within the container is around 10 psig [370 N/m$^2$ (gauge)] at room temperature.

The following examples are illustrative only and it is not intended that the invention be restricted thereto.

Comparative Example

A foamable composition was prepared having the following components:

| | |
|---|---|
| polystyrene in a styrene/acrylic support resin | 45.08 wt % |
| vinyl acetate/ethylene copolymer emulsion | 45.08 wt % |
| surfactants | 1.7 wt % |
| isopropanol (IPA) | 4. wt % |
| ethylene glycol | 2. wt % |
| water repellant | 0.7 wt % |
| rust inhibitor | 1.25 wt % |
| anti-microbial agent | 0.2 wt % |

The polystyrene in a styrene/acrylic support resin is available from Morton International under the trademark Lucidene 370. This is a latex emulsion having a solids content of 48.5% and a particle size of approximately 0.08µm. The vinyl acetate/ethylene copolymer emulsion, available from Air Products under the trademark Airflex 720 BP, was a latex emulsion having a solids content of 72.0% and a particle size of approximately 1.2 µm. The polystyrene had a relatively high glass transition temperature, 103° C., while the vinyl acetate/ethylene copolymer had a relatively low glass transition temperature, 0° C.

The surfactant was a mixture of ethoxylated (2) cetyl alcohol and ethoxylated (2) stearyl alcohol sold under the trademark Procol CA-2/SA-2 from Protameer, Totawa, N.J. The water repellant was flaked stearalkonium chloride sold under the trademark Mackernium SDC-85. The rust inhibitor was sold under the trademark Raybo 60 No Rust and the anti-microbial agent was a fungicide sold under the trademark Polyphase AF1.

The surfactants were melted and mixed with the isopropanol. The mixture was then combined with the polymer emulsions. A quantity of the resulting composition was loaded into an aerosol container and charged with 4–6 wt % of propellant comprising approximately 2:1 volatile liquid hydrocarbon:DME.

The cohesion of foams produced from this composition was determined by measuring the tensile strength of such foams in a tensile tester available from Instron Corporation of Canton, Massachusetts. The composition was discharged into a 1"×2"×1" (2.5 cm×5.0 cm×2.5 cm) cavity and allowed to dry for 72 hours to form biscuits. The biscuits were then pulled in the tensile tester to determine their tensile strength at room temperature. Biscuits formed from the foamable composition given immediately above had a pull strength of 0.7 lbs.

Transmission electron microscopy indicates that foams formed by the discharge of this composition from the aerosol canister comprise a coalesced, discontinuous solidified vinyl acetate/ethylene copolymer phase suspended in a continuous solidified styrene/acrylic copolymer-rich phase.

EXAMPLE 1

Compositions having the following components were made the subjects of a qualitative screening:

| | |
|---|---|
| polystyrene in a styrene/acrylic support resin | 43–45 wt % |
| vinyl acetate/ethylene copolymer emulsion | 43–45 wt % |
| microfibers | 1–3 wt % |
| surfactants | 1.7 wt % |
| isopropanol (IPA) | 4. wt % |
| ethylene glycol | 2. wt % |
| water repellent | 0.7 wt % |
| rust inhibitor | 1.25 wt % |
| anti-microbial agent | 0.2 wt % |

Compositions were prepared using several different types of organic microfibers, including nylon, polyethylene terepthalate (PET), "Orlon" acrylonitrile material, "Kevlar" material and spandex. The other components in the compositions were the same as those identified in the Comparative Example above. The total components added to 100 wt %.

The steps by which the compositions were prepared were the same as those given in the Comparative Example above, except that the microfibers were blended into the compositions after the surfactant mixtures were combined with the polymer emulsions and before the compositions were loaded into the aerosol containers.

The qualitative screening suggested that compositions including the nylon and PET microfibers merited further study. The "Orlon" acrylonitrile fibers did not disperse readily into the polymer emulsion/surfactant mixture. It is believed that the "Kevlar" fibers were too short to effectively strengthen the compositions. The spandex fibers likewise provided no observable improvement in the tensile strength of the material.

EXAMPLE 2

In order to further test the properties of foamable compositions incorporating nylon and PET microfibers, a series of compositions were prepared combining these microfibers with the components described in the Comparative Example. (The nylon microfibers used were nylon 6,6 microfibers available from Mini Fibers of Johnsonville, Tenn.)

Biscuits prepared from these compositions were subjected to pull tests using the Instron tensile tester according to the protocol described in the Comparative Example. In addition, the capacity of these foamable compositions to flow through the aerosol valves was rated in comparison with the capacity of the foamable composition of the Comparative Example, with the capacity of the foamable composition of the Comparative example being rated as "Standard." The results of these observations were as follows:

| Composition (by wt %) | PET, crimped ⅛", 3 dpf | PET ¼", 3 dpf | PET ⅛", 6 dpf | PET ¼", 6 dpf | Nylon 6, 6 ¼", 3 dpf | Nylon 6, 6 ¼", 3 dpf |
|---|---|---|---|---|---|---|
| polystyrene in styrene/acrylic support resin | 43.58 | 43.58 | 44.58 | 44.58 | 43.58 | 44.08 |
| vinyl acetate/ethylene copolymer emulsion | 43.58 | 43.58 | 44.58 | 44.58 | 43.58 | 44.08 |
| microfibers | 3 | 3 | 1 | 1 | 3 | 2 |
| surfactant | 1.7 | 1.7 | 1.7 | 1.7 | 1.7 | 1.7 |
| IPA | 4 | 4 | 4 | 4 | 4 | 4 |
| ethylene glycol | 2 | 2 | 2 | 2 | 2 | 2 |
| water repellant | 0.7 | 0.7 | 0.7 | 0.7 | 0.7 | 0.7 |
| rust inhibitor | 1.25 | 1.25 | 1.25 | 1.25 | 1.25 | 1.25 |
| anit-microbial agent | 0.2 | 0.2 | 0.2 | 0.2 | 0.2 | 0.2 |
| Tensile Strength (in psi) | 1.4 | 1.4 | 1.65 | 2.1 | 2.4 | 3.4 |
| Extrusion | Sub-standard | Sub-standard | Slow | Poor | Very Poor | Very Poor |

Two conclusions were drawn from these observations. First, the compositions having microfiber lengths of ¼ inch (6.4 mm) did not extrude well through the aerosol valves; in fact, microfibers of that length adversely affected the seating of the valves. For this reason, it was determined that the preferred lengths of the microfibers was no greater than one-eighth inch (3.2 mm) when aerosol valve delivery systems are used as the foam delivery system.

Second, it appeared that the nylon 6,6 microfibers performed significantly better than the PET microfibers. The superiority of the compositions incorporating microfibers composed of nylon 6,6, which has amine functionality for hydrogen bonding, over compositions incorporating PET microfibers of the same size is consistent with the belief that the microfibers improve the cohesion of the foam through secondary chemical bonding rather than physical entanglement.

EXAMPLE 3

The performance of foamable compositions incorporating nylon 6,6 microfibers was further explored by preparing a series of compositions having varying concentrations of 1.8 dpf, one-eighth inch nylon 6,6 microfibers. The same preferred materials, preparation steps and test protocols were used in connection with this series of compositions as were used in Example 2 above.

The results were as follows:

| Composition (by wt %) | 2.40 wt % nylon 6, 6 fibers | 2.80 wt % nylon 6, 6 fibers | 3.20 wt % nylon 6, 6 fibers | 3.60 wt % nylon 6, 6 fibers |
|---|---|---|---|---|
| polystyrene in styrene/acrylic support resin | 43.88 | 43.68 | 43.48 | 43.28 |
| vinyl acetate/ethylene copolymer emulsion | 43.88 | 43.68 | 43.48 | 43.28 |
| surfactant | 1.7 | 1.7 | 1.7 | 1.7 |
| IPA | 4 | 4 | 4 | 4 |
| ethylene glycol | 2 | 2 | 2 | 2 |
| water repellant | 0.7 | 0.7 | 0.7 | 0.7 |
| rust inhibitor | 1.25 | 1.25 | 1.25 | 1.25 |
| anit-microbial agent | 0.2 | 0.2 | 0.2 | 0.2 |
| Tensile Strength (in psi) | 2.42 | 2.47 | 2.7 | 3.22 |
| Extrusion | Standard | Standard | Standard | Clogged |

These results suggested that, above a microfiber content of approximately 3.2 wt %, the compositions would not extrude well through the aerosol valve. From these results, it was determined that the preferred microfiber content for extrusion through a narrow nozzle orifice was between about 2.4 wt % to about 3.2 wt %, with 3.0 wt % being considered optimal. Of course, microfiber content levels may vary when other foam delivery systems are used.

EXAMPLE 4

Further studies were made to determine the effects of varying the concentrations of other components in the foamable compositions. The same preferred materials (along with 1.8 dpf, one-eighth inch nylon 6,6 microfibers), preparation steps and test protocols were used evaluating this series of compositions as were used in evaluating the compositions of Example 2 above. (The composition marked "Comparative Example 1" is that described in the Comparative Example above. As can be seen Comparative Example 2 differs only slightly from Comparative Example 1.)

The results were as follows:

| Composition (by wt %) | 4A | 4B | Comparative Example 2 | Comparative Example |
|---|---|---|---|---|
| polystyrene in styrene/acrylic support resin | 43.58 | 46.45 | 45.7 | 45.08 |
| vinyl acetate/ethylene copolymer emulsion | 43.58 | 46.45 | 45.7 | 45.08 |
| nylon 6, 6 microfibers | 3 | 3 | 0 | 0 |
| surfactant | 1.7 | 1.7 | 1.7 | 1.7 |
| IPA | 4 | 1.5 | 4 | 4 |
| ethylene glycol | 2 | 0 | 2 | 2 |
| water repellant | 0.7 | 0.7 | 0.7 | 0.7 |
| rust inhibitor | 1.25 | 0 | 0 | 1.25 |
| anit-microbial agent | 0.2 | 0.2 | 0.2 | 0.2 |
| Tensile Strength (in psi) | 2.55 | 7.45 | 1.65 | 0.7 |
| Extrusion | Standard | Clogged | Standard | Standard |

A comparison of the performance of Composition 4A with that of the Comparative Example demonstrated the superior cohesion properties of compositions incorporating nylon 6,6 microfibers.

EXAMPLE 5

A series of compositions were prepared to study the effect of adding behenyl alcohol to the compositions. Apart from the addition of behenyl alcohol to the mixture of IPA and surfactant prior to combining this mixture with the polymer emulsions, the same preferred materials and preparation steps were used as in the Comparative Example above. The preferred behenyl alcohol component was either Stenol 1822A material, available from Henkel Corporation, or behenyl alcohol available from Protameen Chemicals Inc. The high temperature stabilities of these compositions were studied by measuring the percent volumetric cavitation of an elongated bead of the foamable composition after solidifying for 20 hours at 158° F. (70° C.).

The results were as follows:

| Composition (by wt %) | 1.84 wt % behenyl alcohol | 1.29 wt % behenyl alcohol | 1.05 wt % behenyl alcohol |
|---|---|---|---|
| polystyrene in styrene/acrylic support resin | 44.15 | 44.43 | 44.54 |
| vinyl acetate/ethylene copolymer emulsion | 44.15 | 44.43 | 44.54 |
| surfactant | 1.7 | 1.7 | 1.7 |
| IPA | 4 | 4 | 4 |
| ethylene glycol | 2 | 2 | 2 |
| water repellant | 0.7 | 0.7 | 0.7 |
| rust inhibitor | 1.25 | 1.25 | 1.25 |
| anit-microbial agent | 0.2 | 0.2 | 0.2 |
| Percent Cavitation | 16.7% | 35% | 49% |

These results demonstrated the improved high temperature stability which may be obtained from a foamable composition incorporating behenyl alcohol. Without wishing to be bound to any theory of operation, it is noted that the surfactants used in the Comparative Example, ethoxylated (2) cetyl alcohol and ethoxylated (2) stearyl alcohol, had melting point midranges of 90° F. (32° C.) and 110° F. (43° C.), respectively. The behenyl alcohol used had a melting point on the order of 60° C.–70° C. It is believed that the higher melting point of the behenyl alcohol promoted its solidification about the interfaces of bubbles formed in the extruded composition despite temperatures above the melting points of the ethoxylated fatty alcohol surfactants, thereby inhibiting cavitation as the composition solidified.

EXAMPLE 6

The properties of a foamable composition incorporating behenyl alcohol were further highlighted by comparing the properties of a foamable composition including behenyl alcohol with those of the composition of the Comparative Example above.

Tensile tests were performed on these two compositions using the Instron tensile tester in accordance with the procedure discussed in Example 2. The percent volumetric cavitation of an elongated bead of the foamable composition was measured after the composition had solidified for 20 hours at 122° F. (50° C.). The degree of blowout was determined by counting the number of ruptures in the surface of a 30"×2" solidifying mass of the extruded composition. Finally, the low temperature embrittlement of the material was determined by impact testing at 0° F. (−18° C.).

The results of these tests were as follows:

| Composition (wt %) | 6A | Comparative Example |
|---|---|---|
| polystyrene in styrene/acrylic support resin | 44.08 | 45.08 |
| vinyl acetate/ethylene copolymer emulsion | 44.08 | 45.08 |
| surfactant | 1.7 | 1.7 |
| behenyl alcohol | 1.84 | 0 |
| IPA | 4 | 4 |
| ethylene glycol | 2 | 2 |
| water repellant | 0.85 | 0.7 |
| rust inhibitor | 1.25 | 1.25 |
| anti-microbial agent | 0.2 | 0.2 |
| Tensile Strength (in psi) | 1.6 | 0.7 |
| Percent Volumetric Cavitation (122° F., 50° C.) | 8.80% | 100.00% (complete collapse) |
| Blowout | 2 | 1.4 |
| Low Temperature (0° F., −18° C.) Embrittlement (lb-in.) | 0.19 | 0.44 |

These results demonstrated the superior tensile strength and high temperature stability of the composition incorporating behenyl alcohol. Based on these results, it was determined that the preferred behenyl alcohol content was approximately 1.84 wt %.

EXAMPLE 7

The effects on cohesion of adding 2-hydroxyethyl methacrylate (2-HEMA) as part of the monomer mix that is polymerized into the styrene/acrylic copolymer emulsion, were studied by preparing yet another series of foamable compositions using the preferred components, preparation steps and test protocols of Examples 2 and 3 in combination with various proportions of nylon 6 microfibers, behenyl alcohol and 2-HEMA.

The results were as follows:

| Components (wt %) | 7A | 7B | 7C | 7D | 7E |
|---|---|---|---|---|---|
| polystyrene in styrene/acrylic support resin | 42.58 | 42.83 | 41.33 | 41.58 | 40.08 |
| vinyl acetate/ethylene copolymer emulsion | 42.58 | 42.83 | 41.33 | 41.58 | 40.08 |
| 2-HEMA | 0 | 2.5 | 2.5 | 5 | 5 |
| nylon 6, 6 microfibers | 3 | 0 | 3 | 0 | 3 |
| surfactant | 1.7 | 1.7 | 1.7 | 1.7 | 1.7 |
| behenyl alcohol | 1.84 | 1.84 | 1.84 | 1.84 | 1.84 |
| IPA | 4 | 4 | 4 | 4 | 4 |
| ethylene glycol | 2 | 2 | 2 | 2 | 2 |
| water repellant | 0.85 | 0.85 | 0.85 | 0.85 | 0.85 |
| rust inhibitor | 1.25 | 1.25 | 1.25 | 1.25 | 1.25 |
| anti-microbial agent | 0.2 | 0.2 | 0.2 | 0.2 | 0.2 |
| Tensile Strength (in psi) | 8.88 | 2.28 | 7.76 | 1.20 | 2.94 |
| Extrusion | — | Standard | — | Standard | — |

The results demonstrated that adding 2-HEMA to Compositions 7B and 7D improved their pull strength as compared to the 1.6 psi tensile strength obtained for Composition 6A of Example 6, which contained no 2-HEMA. On the other hand, while the addition of 3 wt % nylon 6,6 microfibers in Compositions 7C and 7E improved the tensile strengths of those compositions as compared with the tensile strengths of Compositions 7B and 7D which had the same levels of 2-HEMA but no microfibers, the addition of large amounts of 2-HEMA (that is, over 2.5 wt %) with 3 wt % nylon 6,6 fibers in Compositions 7C and 7E adversely affected the tensile strengths of the compositions as compared to that of Composition 7A, which incorporated the microfibers but no 2-HEMA.

The foamable compositions in accordance with the invention can be utilized to fill joints, cracks, crevices, gaps, or other spaces in or between building or structural units. For example, in FIG. 1, the foamed composition 100 is applied to seal cracks 200 that exist between adjacent wall board members 22 of the building structure. The foamable composition 100 is supplied to the crack from a pressurized spray canister 102.

Figure 2:
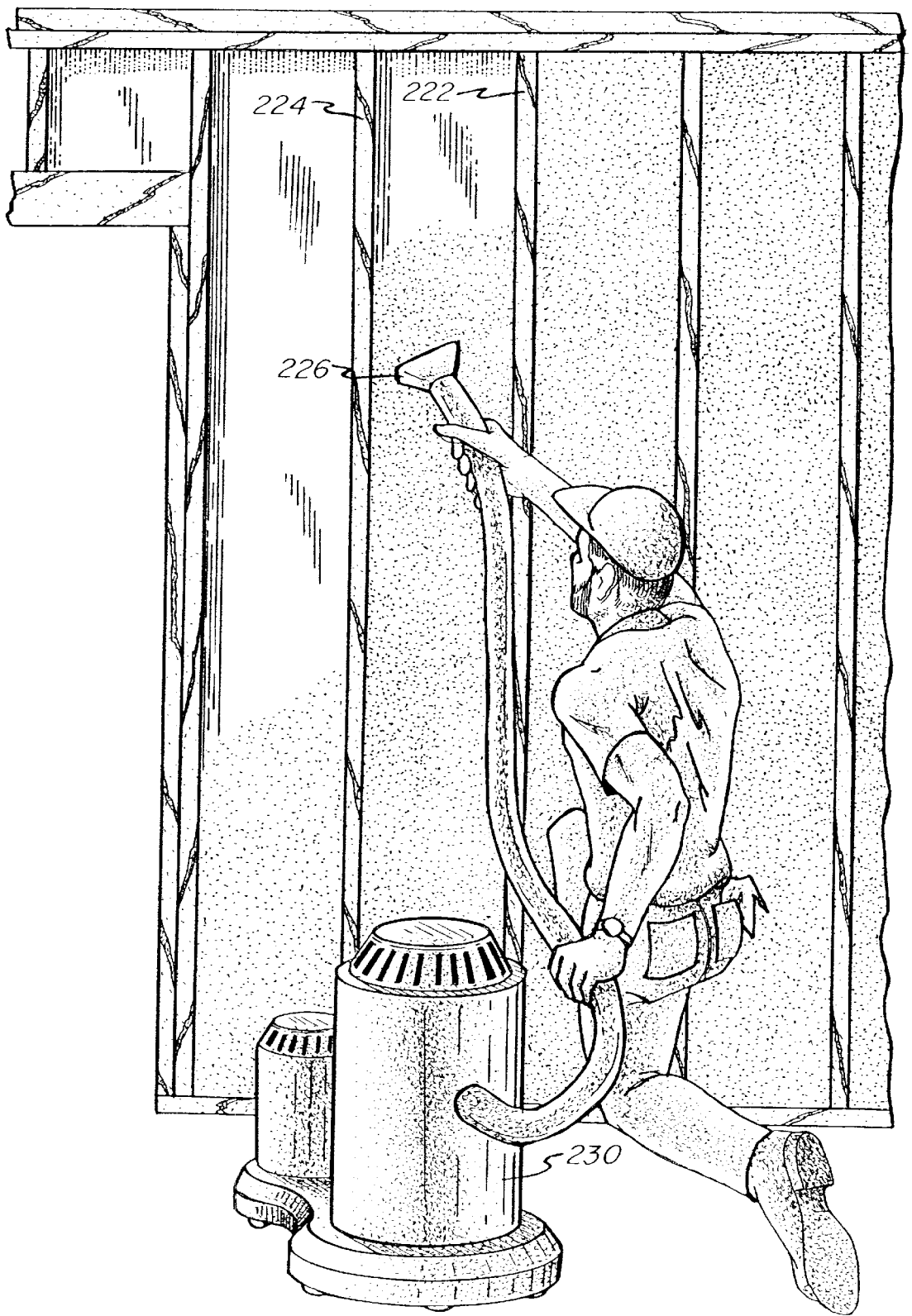
FIG. 2 is a schematic view showing use of the compositions to insulate building structures.

Similarly, the foamable compositions can be utilized to provide insulation in the construction industry. With regard to FIG. 2, the composition is applied in foamable form between wall stud members 222, 224. Here, the foamable composition is supplied through a wide-mouth nozzle means 226 from an enlarged pressurized canister 230 that may be conveniently strapped onto the back of the worker. In such manner, foams in accordance with the invention can be applied to provide thermal insulating sound dampening or moisture barrier-like properties.

Figure 3:
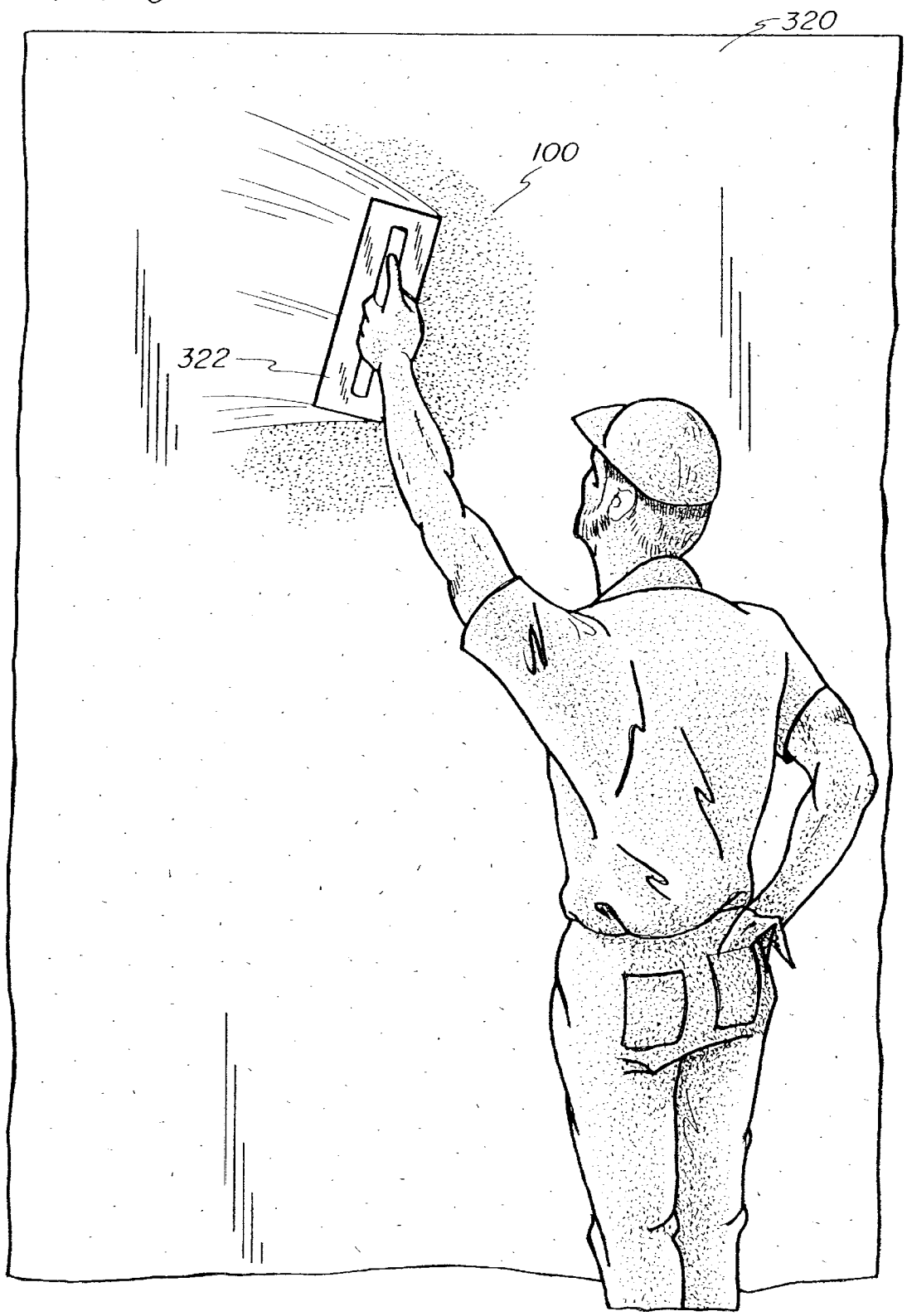
FIG. 3 is a schematic view highlighting use of the compositions of the invention in wall patching methods.

The compositions in accordance with the invention may be applied with appropriate tools or the like to the requisite substrate. As shown in FIG. 3, the foamable composition 100 of the invention is utilized as a patching material to fill concavities or holes in the wall surface 320. The user simply applies a mass or mound of the composition 100 into the desired concavity and works the composition with a trough 322. After the foamable composition sets up, a smooth surface is provided.

Figure 4:
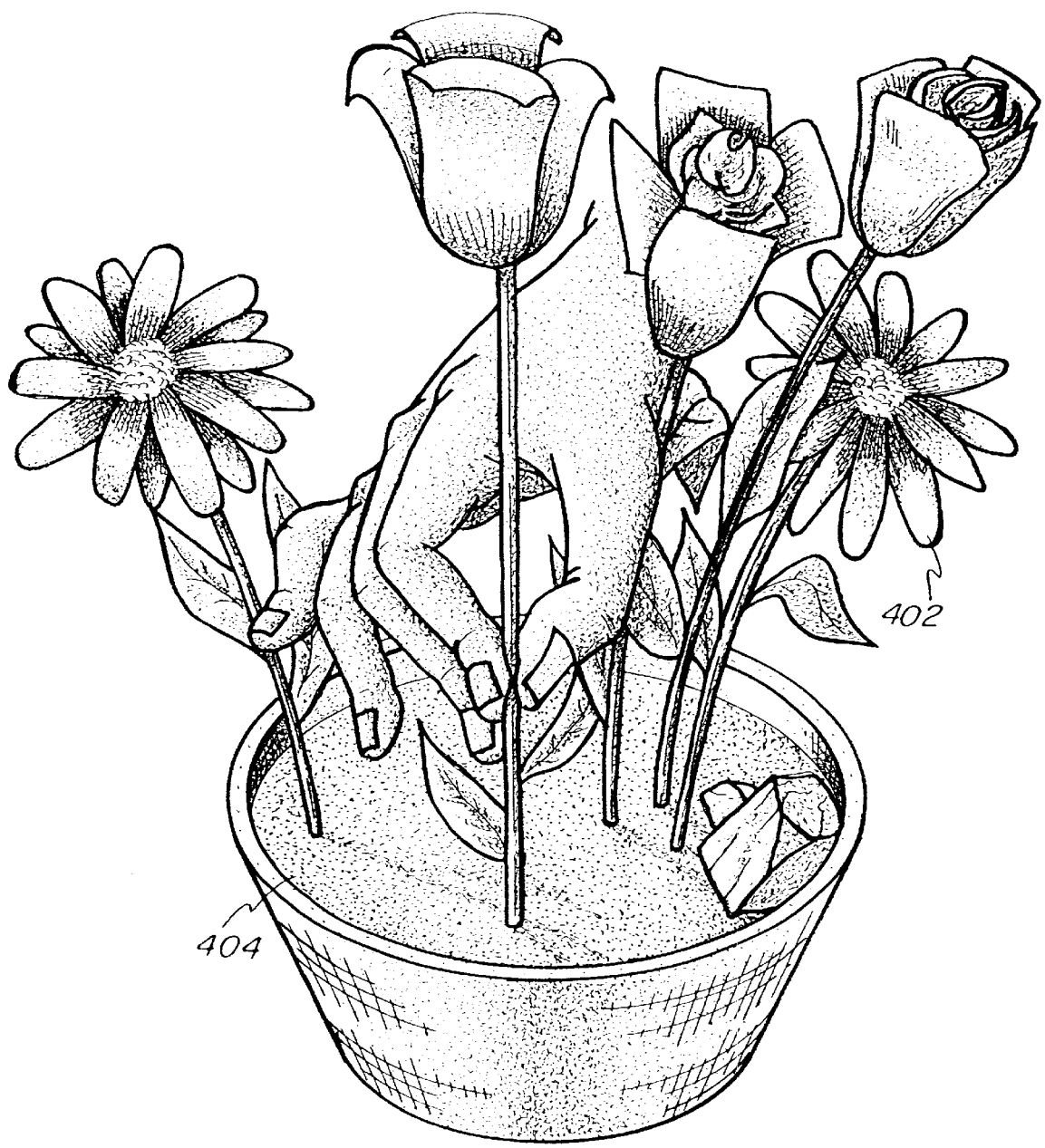
FIG. 4 is a schematic view showing an artificial terrain composed of the instant foamable compositions, shown here as a mount for a floral display.

As shown in FIG. 4, the foamable composition may also be utilized to provide an artificial terrain 404, for a variety of craft and hobby purposes. Here, the foamable composition is supplied and formed into the requisite artificial terrain 404 which serves as an anchor site or means for supporting a plurality of flowers 402. Although the artificial terrain 404 is shown here in conjunction with and as providing a support for flowers 402, the foamable compositions can be used to supply similar terrains or background materials for a host of other craft or hobby items.

Figure 5:
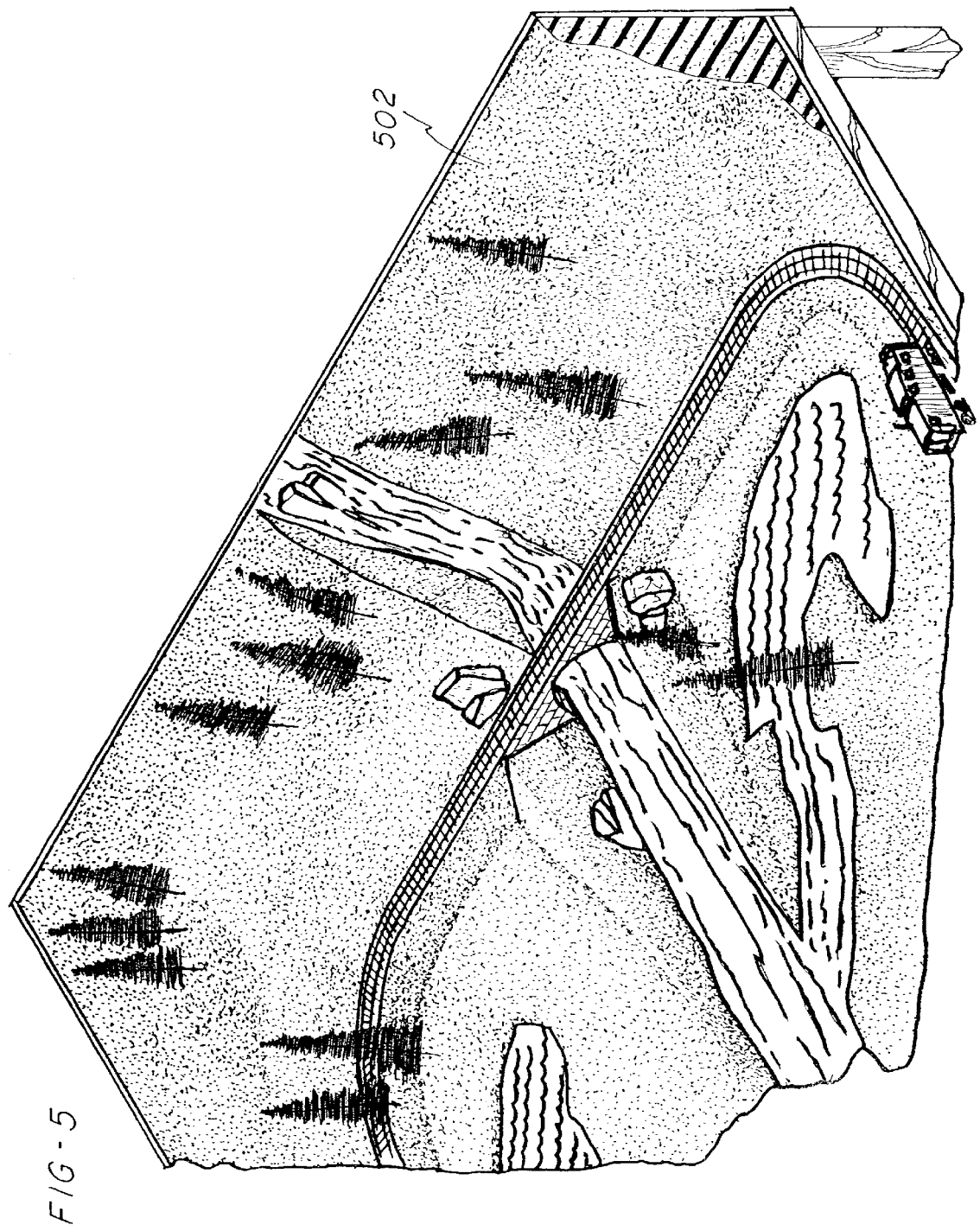
FIG. 5 is a schematic view of a model train set-up, having an artificial terrain background composed of the foamable compositions of the invention.

In FIG. 5, the scenic background 502 formed of the foamable compositions of the invention, is utilized to provide a planned, artificial topography for a model railroad set.

The latex polymer foam compositions of the invention have a natural home in the craft market due to the convenience and safety of a water based foam. The toy market for this foam technology is attractive for the same reasons. This latex polymer foam technology has application in automotive and industrial equipment manufacturing as an insulating sealant or adhesive. Other industrial applications may include the use of open-celled foams for sewage treatment, filtration devices, anion/cation exchange resins, and microbiological growth media. Medical applications could include the investigation of open-celled foams for tissue grafting or biomedical implants and stabilization of biological macromolecules such as proteins, cellulosics, and polysaccharides into foam products.

The foams in accordance with the invention may be used as encapsulating or coating media for application over toxic and/or other hazardous materials. For example, asbestos bearing structural units such as walls, roofs and flooring may simply be coated with the foam compositions. After drying, the thus covered structural units would exhibit reduced airborne contaminant expulsion. Possibly the foams could even be used to encapsulate radioactive materials.

As previously noted, latex foam compositions of the invention may be used as a foam insulating sealant, ceiling texture, non-shrink caulk, textured patching compound, stucco repair product, white glue, construction adhesive, spackling and hand cleanser.

There are a myriad of other potential uses for these compositions.

The following are mentioned as possibilities:
1) crack filling applications
2) component in wallboard tape/mud replacement products
3) component in driveway crack sealer
4) component in foam-in-place bug repellant
5) component in smoke/fire containment product
6) pipe insulation sealant
7) painter's caulk
8) component in foam-in-place gasket material
9) component in sound absorber
10) component in adhesive grout
11) component in alignment aid—temporary tack-in-place
12) component in foam-in-place leveler/gap filler/adhesive 13) component in replacement for white glues 14) component in bulk caulk delivery system 15) component in moisture barrier Many of these compositions lend themselves to bulk application techniques well suited for the manufactured housing market. Others like the patching and repair products are better suited to the convenient "no gun needed" aerosol can.

Unlike competitive polyurethane foams the instant foamable compositions contain no isocyanates which are skin and respiratory sensitizers. (Once sensitized, exposure to isocynates can cause respiratory failure.) The instant compositions will not permanently bond to the skin and can be easily removed by water cleanup. Polyurethane requires a hazardous flammable solvent for its removal. The compositions of the invention are easy to control during application. They are toolable and moldable, and they are reusable eliminating the waste and mess of polyurethane foam. Moreover, the foam compositions are paintable with all paints. Oil based paints (including virtually all spray paint) will dissolve polyurethane foam. The instant foam compositions do not require painting for exterior applications because they are UV stable. They remain white and will not discolor or degrade like polyurethane foam. The compositions exhibit no hydraulic effect to cause buckling or structural failure.

Accordingly, in its broadest contexts, the invention pertains to the use of a high temperature foam stabilizer as part of the foamable composition in order to inhibit foam cavitation when the foams are used in high temperature environments of greater than about 90° F. These high temperature foam stabilizers have melting points of about 110° F. and greater. Preferably, they are polar, long chain fatty alcohols having greater than about 20 c atoms in the molecule. These compounds are added to the foamable composition in an amount of about 0.25–10 wt % based an the total weight of the composition. Preliminary results indicate preference for addition of behenyl alcohol ($C_{22}$) at a level of about 1–2 wt % of the foamable composition, most preferably 1.842 wt %.

In another aspect, microfibers are added to the foamable composition in order to include foamed product cohesiveness. Preferably, the microfibers confuse functionability that well enable chemical bonding, such as hydrogen bonding, between the fibers and the film forming polymer component of the foamable composition. It has been found that nylon 6,6 fibers, probably by reason of hydrogen bonding between the amine function of the fiber and the carbonyl present from a vinyl acetate type film forming polymer, show especially good results in terms of tensile strength of the foamed compositions.

Theoretically, it would be desirable to incorporate hydrogen bondable functions into the monomers that would in turn be polymerized in the film forming polymers that are used as a foamable component. Attempts to incorporate the hydroxy functional 2-hydroxyethylmethacuylate monomer into a styrene/acrylic emulsion polymer have been successful in terms of forming a foamable, film forming polymer. However, incorporation of such repeat units into the polymer has not, at this time, led to any overall cohesiveness increase of the foam when nylon 6,6 microfibers are added as part of the formulation.

Preferable, these hydrogen bondable microfibers are added to the foamable composition in an amount of about 0.0–10 wt % based on the overall composition wt. So that the foamable composition can be extruded through a narrow aerosol delivery nozzle, it is preferred to add about 2.4 to 3.2 wt % thereof to the foamable composition.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method for filling joints, cracks or spaces existing between adjacent structural units comprising applying to said joints, cracks, or spaces a sufficient filling amount of a foamable composition comprising:

(a) an aqueous emulsion comprising a film forming polymer;

(b) a liquid propellant;

(c) a surfactant; and (d) a high temperature foam stabilizer comprising a fatty alcohol having 20 or greater carbon atoms and having a melting point of about 110° F. and greater, supplying said composition in foam form as filler and then allowing said foam to dry.

2. A method as recited in claim 1 wherein said fatty alcohol comprises behenyl alcohol.

* * * * *